Patented July 30, 1946

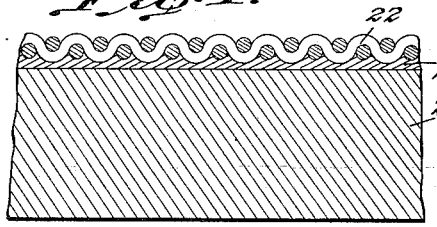
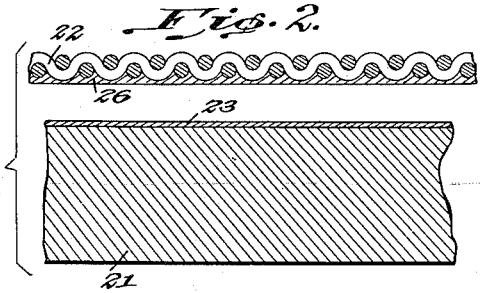
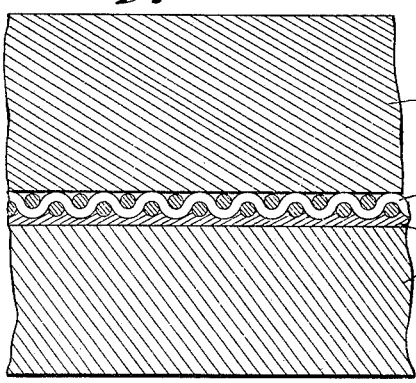
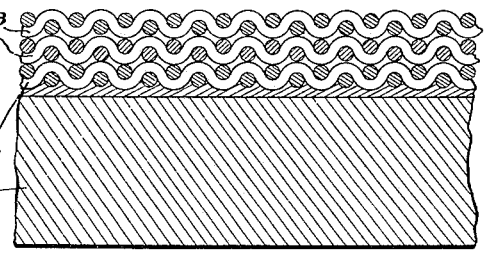
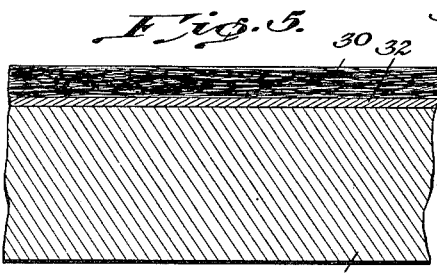
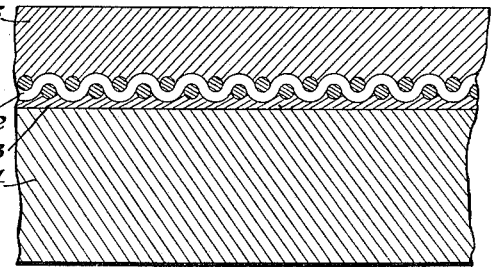
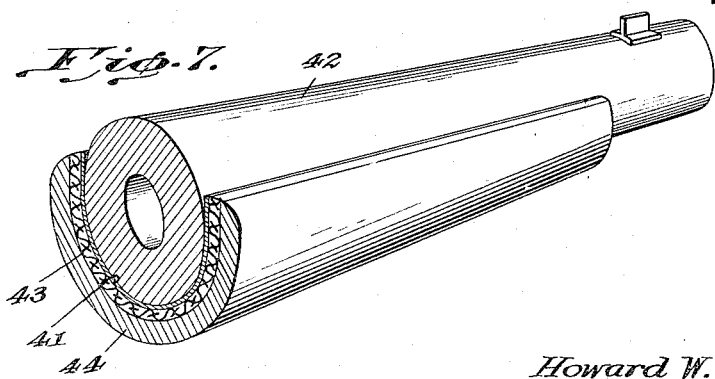

2,404,904

UNITED STATES PATENT OFFICE 2,404,904

BONDING GLASS FABRICS TO INORGANIC SOLIDS

Howard W. Collins, Newark, Ohio, assignor to Owens-Corning Fiberglas Corporation, a corporation of Delaware Application November 6, 1940, Serial No. 364,539

4 Claims. (Cl. 154—128)

The present invention relates to glass fabrics and similar glass fibrous products bonded to inorganic solid substances such as metals, ceramics, glass, etc., and to methods for so bonding. It also relates to composite articles comprising synthetic resinous bodies joined to such substances, and to a method of making them.

Among the objects of the invention is to provide means for bonding an organic solid article to an inorganic solid article which must operate at high temperatures at which the organic article would be deleteriously affected. It is also an aim to provide an inorganic yieldable surface on inorganic solid articles to which may be joined, if desired, various coatings, coverings, decorations, organic objects and the like.

It is another object of the present invention to provide a method for joining fibrous glass products such as glass fabrics to the surface of metal, ceramics, asbestos or hydraulic cements, concrete, asbestos products, glass, etc., with a relatively permanent heat-resistant bond, and to provide an article so formed. The surfaces may thus be decoratively covered and, where required, thermally and electrically insulated.

It is another object of the invention to provide a method for forming a composite covering for such surfaces tightly bonded thereto and formed of a plurality of glass fabrics.

It is a further object to provide means for securing to these surfaces, materials such as synthetic resins which have heretofore been difficult to attach thereto. The securing means provided permits expansion and contraction of the surface relatively to the resinous member while maintaining firm attachment therebetween.

The invention comprises coating the surface to be covered with vitreous enamel capable of tightly bonding to the surface, and bringing into intimate contact with the enamel while heated to plastic or liquid condition, a glass fabric such as a mat, woven cloth, or layer of fibers or yarns. Such enamel tends to adhere by fluxing or fusing and/or partially dissolving into the fibers with which it comes into contact, thus forming a durable, strong bond. Owing to the irregularities of the fabric a mechanical bonding may also be set up.

Preferably, the glass fibrous product is heated before it is brought into contact with the softened enamel to improve the adhesion of the enamel to the fibers.

It is also preferable to apply frit to the fabric at its enamel-contacting face before its application. The frit may have a lower maturing temperature than the enamel so that substantially complete flow of the frit about the fibers and over the vitreous enamel on the surfaces is obtained at the temperature of the plastic enamel.

The majority of vitreous enamels known at the present time to be capable of securely bonding to surfaces of the character described are ones that are plastic at a temperature equal to or above a temperature at which the fibers will be deleteriously affected as by being materially fused or partially fused together or softened so as to take a permanent set. This temperature of the fibers may be designated as the critical temperature. When employing such enamels having maturing temperatures higher than the critical temperature of the fibers it is preferable to maintain the temperature of the outer face of the fabric substantially below the critical temperature of the fibers. The lower temperature of the outer face provides a temperature gradient through the thickness of the fabric so that at least a portion of the fibers will be unaffected by the heat of the enamel and the fabric will retain its physical properties throughout a substantial portion of its thickness.

The invention also comprises forming on a surface of the character described, a composite covering of a plurality of layers of glass fabrics joined together in a unitary structure. It comprises, further, securing resins and like material to such surfaces by means of an intermediate glass fabric bonded to the surface.

In the drawing:

Figure 1 is a diagrammatic cross-sectional view of a metal plate having a glass fabric bonded thereto in accordance with the present invention.

Figure 2 is a schematic representation of a step in the process of the present invention.

Figure 3 is a schematic representation of a further step.

Figure 4 is a cross-sectional diagrammatical view of a metal plate having a composite covering of glass fabrics applied thereto.

Figure 5 is a cross-sectional view illustrating a felt of glass fibers bonded to a metal sheet.

Figure 6 is a cross-sectional view illustrating a metal plate surfaced with synthetic resin, and;

Figure 7 is a cross-sectional perspective view depicting the application of a fabric-covered metal member to the construction of a rifle.

Within the preferred embodiment of the invention a metal plate 21 or other object of metal, ceramic, or glass to which it is desired to bond a glass fabric 22 is coated with vitreous or porcelain enamel capable of adhering tightly to the particular surface. The vitreous coating, represented at 23, is heated at the time of application or later to a fluid or plastic condition and a glass fabric brought into intimate contact with the coating while it is thus softened.

Where the enamel employed matures at a temperature above the critical temperature of the fibers it has been found desirable to maintain the outer face of the fabric below the critical temperature. This may be accomplished by contacting the face of the fabric opposite to the enamel-engaging face with a member maintained at a temperature substantially below the critical temperature of the fibers. Such a member may take the form of a pressing iron or platen 25 at a temperature substantially below the temperature of the enamel but preheated sufficiently so as not to chill the plastic vitreous enamel on the surface. This maintains a temperature gradient through the thickness of the fabric that prevents a substantial portion of the fibers in the fabric from reaching the critical temperature. The outer portions of the fabric thus retain the physical characteristics of the fabric.

As an example of the method of the present invention, a steel plate to be covered is coated with vitreous enamel capable of adhering tightly to the surface thereof and placed in a usual furnace to be heated to the temperature at which the enamel will be plastic or fluid. One such enamel requires a temperature of approximately 1350° F. After the enamel has become fluid, a glass fabric is pressed into intimate contact with the enamel by means of a metal platen placed on the upper face of the fabric. The platen is preheated to a temperature of substantially 700° F. to thereby prevent undue chilling of the vitreous enamel while maintaining a substantial portion of the fabric throughout its thickness at a temperature below the critical temperature of the glass fibers. The plastic vitreous enamel flows into contact with the fibers at the inner surface of the fabric and fuses thereto so that upon cooling and hardening it securely bonds the fabric to the surface.

It has been discovered that the bonding effect is improved if the fabric prior to its application is buttered or coated with frit in powder or paste form. The frit may form a more or less continuous coating as represented at 26 in Figure 2. It may have a maturing temperature below that of the vitreous enamel on the surface since it is to provide a means for increasing the intermingling of the vitreous enamel and the adjacent glass fibers and need not in itself form a bond with the surface. It has been found practical to employ a frit maturing at a temperature several hundred degrees below the maturing temperature of the vitreous enamel so that in the above mentioned example, the frit when employed may be one maturing at a temperature of approximately 1100° F.

The fabric bonded to the surface may have successive glass fabrics 28 bonded thereto in the manner above-described or may have the successive layers of fabrics joined to the first layer by means of suitable binding materials such as resins, asphalt, wax, gum, and the like. The successively applied fabrics may each be impregnated with synthetic resin such as phenol formaldehyde and pressed onto the first-applied fabric 22 and then heated to cause the resin to be thermally set. In this manner, a covering of glass fabrics may be built up on a surface to any desired thickness. This is particularly applicable to cases where the glass fabrics are employed as electrical or thermal insulating coverings for metal.

In Figure 5, a fabric in the form of a glass fibrous felt 30 is illustrated bonded to a metal sheet 31 by vitreous enamel represented at 32. The felt may be applied in substantially the manner above described.

The present invention provides means for bonding to the surfaces of inorganic solids, materials that have heretofore been difficult to secure thereto because of the lack of adherence and the difference in contraction and expansion between the surfaces and the materials. Sheets 35 or other forms of synthetic resinous material, for instance, phenol or urea formaldehyde, may be pressed onto the glass fabric previously bonded to the surface while the resinous material or the fabric-contacting surface thereof is in partially cured or uncured condition. The resin is then thermally set with the material impregnating the glass fabric and serving to key the material to the fabric. Irregular and intricate surfacings of plastics may be formed on the glass fabric-covered surface by employing resin in the form of molding powder and molding the resin into the desired shape directly on the glass fabric. Since the fabric may be caused to maintain its physical characteristics at its outer surface, any variations in the amount of expansion and contraction between the resin and the surface will be absorbed by relative movement of the fibers and yarns in the fabric. The fabric serves as an insulating medium between the resinous body and the surface so that the transference of heat therebetween is retarded.

It is also possible to apply frit to the surface of the glass fabric only and dispense with any vitreous enamel coating separately applied to the surface to be covered. In this case, the surface is heated to the maturing temperature of the particular frit employed and the frit covered surface of the fabric pressed into contact therewith to cause the frit to melt and bond to the heated surface and to the glass fibers. However, in this method the surface is not always completely covered with the enamel and, if metal, may oxidize and corrode under certain conditions. For this reason it is preferable to apply the enamel directly to the metal as hereinbefore described.

If the surface to be covered is of proper form the application of the glass fabric may be carried out as a continuous process. For example, a metal or glass sheet may be covered with vitreous enamel or frit and overlaid with a glass fabric and fed continuously into a furnace to heat and plasticize the enamel and cause the fabric to bond thereto. The fabric may be pressed into intimate contact with the enamel by a roller or platen cooled to a temperature below the critical temperature of the fibers. If glass fabrics are bonded to sheets of glass, care must be taken to employ an enamel that matures at a temperature well below the temperature at which the glass sheet will soften.

As illustrated in Figure 7 of the drawing, a glass fabric-covered metal member is employed in a rifle construction to thermally insulate the firing guard or hand grip from the rifle barrel to which it is attached and notwithstanding the high relative temperature between the barrel and the guard. The fabric-covered member 41 is of substantially U-shape and closely surrounds the rifle barrel 42 with the metal member in contact with the barrel and the glass fabric 43 presented outwardly and secured as by being cemented to a hand grip 44 of wood, cork composition, plastic, or other desired material. If desired, a glass fabric may also be applied in accordance with the present invention to the inner face of the metal member 41.

Various modifications may be resorted to within the scope of the claims.

I claim:

1. The method of bonding glass fabrics to the surfaces of metal, ceramic, glass and other solid inorganic bodies, which comprises forming on the said surface a coating of vitreous material that matures at a temperature substantially as high as the temperature at which the fibers of the fabric fuse together, heating the coating of vitreous material to a plastic condition, contacting the coating while plastic with a glass fabric provided on its coating-contacting face with frit which matures at a temperature below the maturing temperature of the said vitreous material, and maintaining the outer face of the fabric at a temperature below the temperature of the plastic coating and below the critical temperature of the fabric, whereby a substantial portion of said fabric adjacent the outer surface thereof remains resilient and flexible.

2. As a product of manufacture, a solid inorganic heat-resisting body, a resinous organic body overlying said inorganic body, an insulating medium in the form of a glass fabric interjacent the bodies and adhered to the resinous organic body, a plurality of layers of vitreous enamel between said fabric and said inorganic body, one of said layers being adhered to and adjacent the surface of the inorganic body and formed of enamel fusing at a temperature higher than the fusing point of said glass fabric, another of said layers being adhered to the first layer and being fused to the adjacent fibers of the fabric and formed of enamel fusing at a temperature below the fusing point of said glass fabric, whereby the resinous organic body is securely joined to the inorganic body.

3. The method of bonding glass fabrics to the surfaces of metal, ceramic, glass, and other solid inorganic bodies, which comprises forming on the said surface a coating of vitreous material that matures at a temperature substantially as high as the temperature at which the fibers of the fabric fuse together, heating the coating of vitreous material to a plastic condition, and contacting the coating while plastic with a glass fabric provided on its coating-contacting face with vitreous material that matures at a temperature substantially below the maturing temperature of the first-named vitreous material.

4. The improvement in the ceramic arts which resides in bonding glass fiber to a supporting surface by successively applied coatings of porcelain enamel, the innermost of said coatings of porcelain enamel fusing at a temperature higher than the fusing point of said glass fiber and the outermost of said coatings of porcelain enamel fusing at a temperature somewhat below the fusing point of glass fiber.

HOWARD W. COLLINS.